(12) United States Patent
Armanino et al.

(10) Patent No.: US 7,657,625 B2
(45) Date of Patent: Feb. 2, 2010

(54) METHOD AND SYSTEM FOR REMOTELY DETECTING PARASITE SOFTWARE

(75) Inventors: Frederick Armanino, San Antonio, TX (US); Kevin Meng, San Ramon, CA (US); Sam Ou, San Ramon, CA (US); Steven Gemelos, Cupertino, CA (US)

(73) Assignee: AT&T Intellectual Property I, LP, Reno, NV (US)

( * ) Notice: Subject to any disclaimer, the term of this patent is extended or adjusted under 35 U.S.C. 154(b) by 995 days.

(21) Appl. No.: 11/184,723

(22) Filed: Jul. 19, 2005

(65) Prior Publication Data

US 2007/0036132 A1 Feb. 15, 2007

(51) Int. Cl.
*G06F 15/173* (2006.01)
(52) U.S. Cl. .................. 709/224; 709/223; 709/225; 709/226
(58) Field of Classification Search .......... 370/352, 370/357, 337, 349, 254, 252; 709/224, 223, 709/226, 225; 726/27; 714/47; 455/67.11
See application file for complete search history.

(56) References Cited

U.S. PATENT DOCUMENTS

| | | | | |
|---|---|---|---|---|
| 6,085,324 A | * | 7/2000 | Ogram | 726/5 |
| 7,092,398 B2 | * | 8/2006 | Schweitzer | 370/401 |
| 7,293,081 B2 | * | 11/2007 | Motoyama et al. | 709/223 |
| 2003/0140137 A1 | * | 7/2003 | Joiner et al. | 709/224 |
| 2006/0028996 A1 | * | 2/2006 | Huegen et al. | 370/252 |
| 2008/0294780 A1 | * | 11/2008 | Lanahan et al. | 709/226 |

* cited by examiner

*Primary Examiner*—Thjuan K Addy
(74) *Attorney, Agent, or Firm*—Toler Law Group

(57) ABSTRACT

An Internet Protocol (IP) usage pattern of a first computer system is monitored by a second computer system remotely located from the first computer system. Based on the monitoring, it is determined if the IP usage pattern is abnormal for the first computer system. If the IP usage pattern is abnormal, an alert signal is generated for the first computer system by the second computer system. The alert message indicates a potential presence of parasite software on the first computer system.

22 Claims, 2 Drawing Sheets

US 7,657,625 B2

METHOD AND SYSTEM FOR REMOTELY DETECTING PARASITE SOFTWARE

FIELD OF THE DISCLOSURE

The present disclosure is generally related to computer networks and to computer network address resolution.

BACKGROUND

Parasite software is software that has been installed on a user's computer, typically without the user's knowledge, to perform tasks on behalf of another individual or entity. Examples of parasite software include spyware and adware. Often, the objective of the parasite software is not to harm the user's computer, but rather to provide information to the parasite software's owner and/or to consume free computer resources.

Unlike viruses and worms that palpably and malevolently affect a computer, parasite software often goes unnoticed on users' personal computers. Many anti-virus software packages installed on users' personal computers do not detect the presence of parasite software. Thus, a user will take corrective action to remove parasite software only when he/she either notices performance issues with his/her personal computer or learns that the parasite software exists on another user's computer.

Accordingly, there is a need for an improved method and system of detecting parasite software.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Embodiments of the present disclosure involve an Internet Service Provider (ISP) proactively detecting a possibility of an existence of parasite software on its customer's computers. The potential presence of parasite software is detected for a customer's computer based on the ISP monitoring at least one Internet Protocol (IP) usage pattern of the computer in a manner transparent to the customer. Customers are not required to purchase and/or install any additional software on their computers to detect the potential presence of parasite software on their computers. However, after detecting the potential presence of parasite software on a customer's computer, the customer may be required to install parasite-removal software to quarantine and/or remove the parasite software from the customer's computer. ISPs can use embodiments of the present invention to enhance their service offering and/or to increase revenue.

Figure 1:
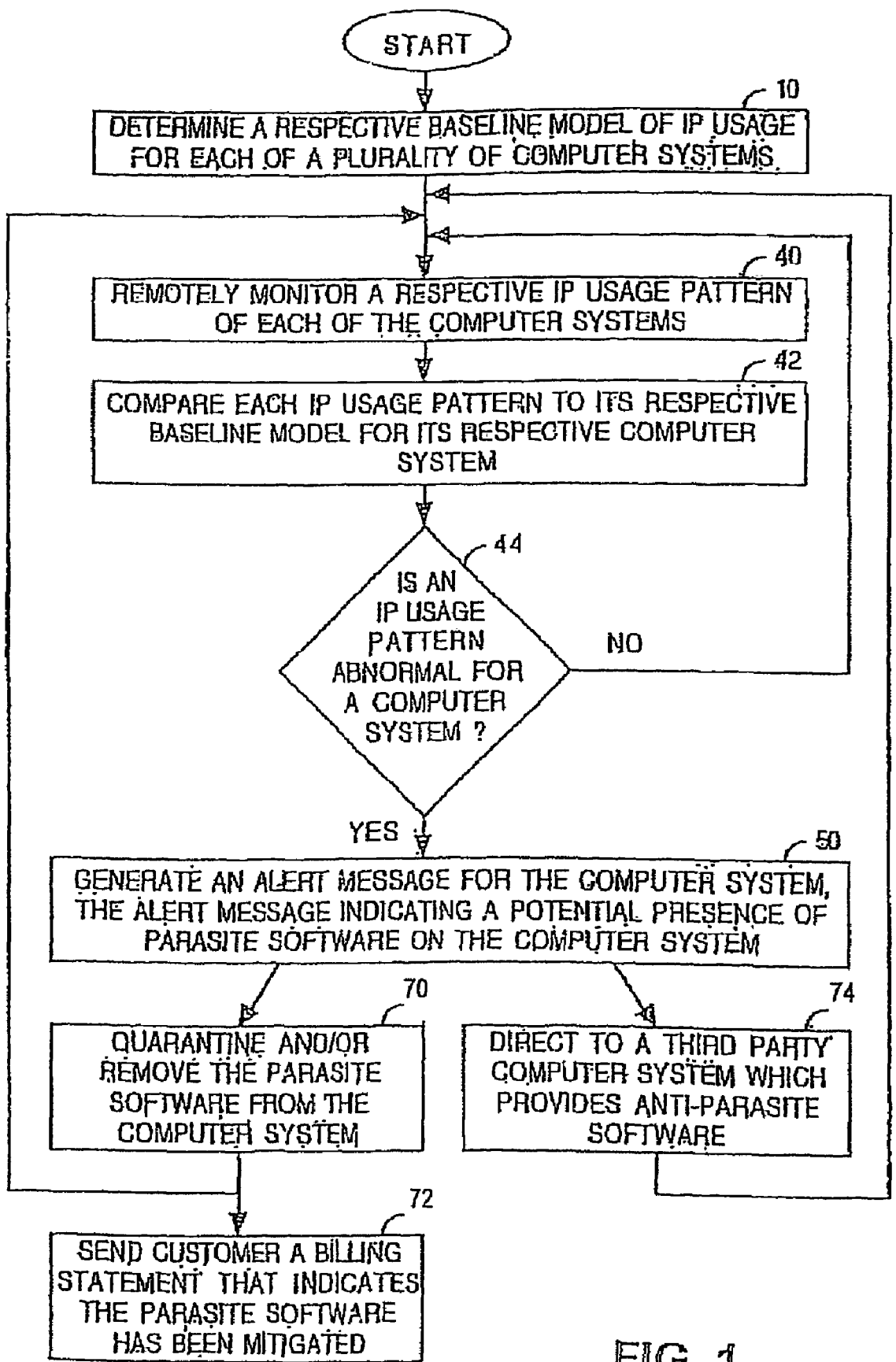
FIG. 1 is a flow chart of an embodiment of a method of remotely detecting parasite software.

Embodiments of the present disclosure are described with reference to FIG. 1, which is a flow chart of an embodiment of a method of remotely detecting parasite software, and FIG. 2, which is a block diagram of an embodiment of a system for remotely detecting parasite software.

As indicated by block 10, the method comprises determining a respective baseline model of IP usage for each of a plurality of computer systems 12. Each baseline model of IP usage is determined by a computer system 14 remotely located from the computer systems 12. In the embodiment of FIG. 2, the computer system 14 is associated with an ISP and each of the computer systems 12 is associated with a respective customer of the ISP. In alternative embodiments, the computer system 14 may be associated with a party other than the ISP.

Figure 2:
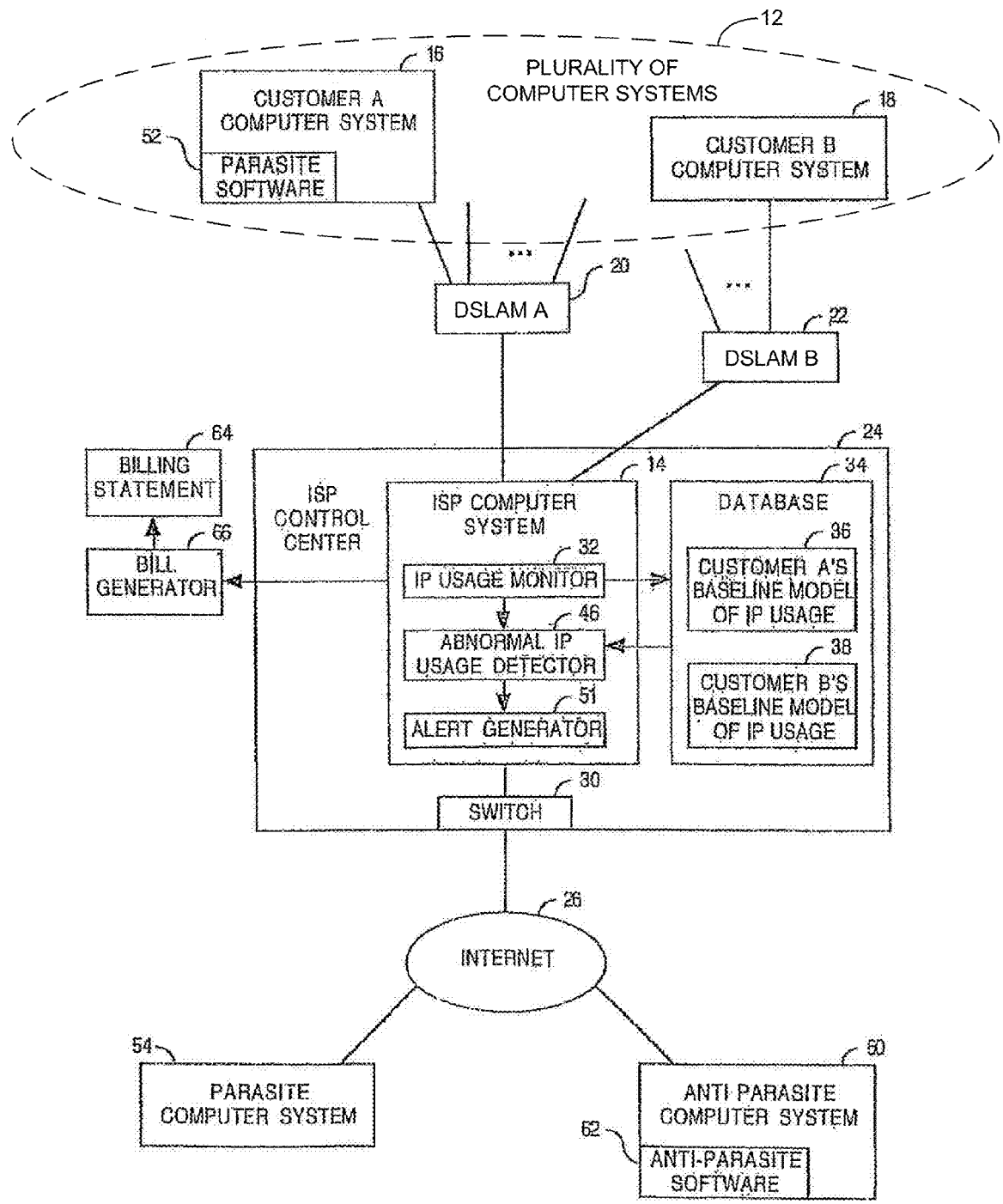
FIG. 2 is a block diagram of an embodiment of a system for remotely detecting parasite software.

In the embodiment of FIG. 2, the ISP provides a Digital Subscriber Line (DSL) service to each of the customers 12. Each of the computer systems 12 has a DSL modem to communicate signals with a DSL Access Multiplexer (DSLAM). For purposes of illustration and example, consider the computer systems 12 comprising a first customer computer system 16 and a second customer computer system 18. The first customer computer system 16 communicates signals with a DSLAM 20 and the second customer computer system 18 communicates signals with a DSLAM 22.

The DSLAM 20 aggregates traffic from the first customer computer system 16 and at least one other customer computer system, and sends the aggregated traffic to an ISP control center 24. Similarly, the DSLAM 22 aggregates traffic from the second customer computer system 18 and at least one other customer computer system, and sends the aggregated traffic to the ISP control center 24. The DSLAM 20 may be remotely located from the DSLAM 22; for example, the DSLAMs 20 and 22 may be located in different central offices. Further, the DSLAMs 20 and 22 may be remotely located from the ISP control center 24.

In the embodiment illustrated in FIG. 2, the computer system 14 is located at the ISP control center 24. Alternatively, the computer system 14 may be co-located with a DSLAM, a central office, or may have another location.

The ISP control center 24 provides its customers access to the Internet 26 or another IP network. The ISP control center 24 may have a switch 30 that connects to the Internet 26. Each of the customers' computer systems 12 generates its own pattern of IP usage to access the Internet 26 using the DSL service.

The computer system 14 comprises an IP usage monitor 32 which monitors IP usage of each of the computer systems 12. The respective baseline model for each computer system is generated based on the monitored IP usage over a period of time. The baseline models are stored in a database 34. Each baseline model may comprise any combination of time-of-day usage patterns, data volume usage parameters, and IP service patterns, such as which one or more transfer protocols (e.g. HTTP, SMTP, P2P, VoIP, FTP and Telnet) are used by its respective computer system. Thus, after performing the act of block 10, the database 34 stores a first baseline model 36 of IP usage of the first customer computer system 16 and a second baseline model 38 of IP usage of the second customer computer system 18.

As indicated by block 40, the method comprises remotely monitoring a respective IP usage pattern of each of the computer systems 12. The IP usage pattern may comprise a time-of-day usage pattern, a data volume usage pattern, an IP service pattern such as a pattern of which one or more transfer protocols are used, or any combination thereof. Each respective IP usage pattern may be monitored by the IP usage monitor 32 of the computer system 14. Each respective IP usage pattern may comprise a daily usage pattern.

As indicated by block 42, the method comprises comparing each IP usage pattern to its respective baseline model for its respective computer system. For example, this act may comprise comparing the IP usage pattern of the first customer computer system 16 to the first baseline model 36 retrieved from the database 34, and comparing the IP usage pattern of the second customer computer system 18 to the second baseline model 38 retrieved from the database 34.

As indicated by block 44, the method comprises determining if an IP usage pattern is abnormal for any of the computer systems 12 based on the act of comparing in block 42. The acts indicated by blocks 42 and 44 are performed by an abnormal IP usage detector 46 of the computer system 14. Either in addition to or as an alternative to using customer-specific baseline models, a general baseline model may be compared to an IP usage pattern to determine if the IP usage pattern is abnormal.

An example of an abnormal time-of-day usage is if a user's baseline model indicates that his/her Internet usage normally occurs from 6:00 PM to 10:00 PM, but the user's computer is being abnormally used at 3:00 AM. This occurrence might indicate that parasite software is sending data to its owner during off-hours.

An example of an abnormal IP service pattern is if a user's baseline model indicates that he/she only uses the HTTP protocol while on the Internet, but the user's computer initiates an abnormal FTP session to an unknown destination. This occurrence also might indicate that parasite software is sending unauthorized data.

If it is determined that none of the IP usage patterns are abnormal, flow of the method is directed back to block 40 to continue remotely monitoring the IP usage patterns of the computer systems 12. Repeating block 40 and its subsequent acts enable the computer system 14 to detect abnormalities in any of the computer systems 12 on an ongoing basis.

If it is determined that an IP usage pattern is abnormal for a computer system, then an act of generating an alert message for the computer system is performed, as indicated by block 50. The alert message is generated by an alert generator 51 of the computer system 14 and sent to and displayed by the computer system having the abnormal IP usage pattern. The alert message indicates a potential presence of parasite software on the computer system having the abnormal IP usage pattern.

For purposes of illustration and example, consider parasite software 52 being installed on the first customer computer system 16 after its baseline model has been determined. Consider the second customer computer system 18 being free of any parasite software.

The parasite software 52 can use the resources of the computer system for a variety of tasks. Examples of the tasks include, but are not limited to: displaying annoying pop-up advertisements; changing settings, such as Internet-related settings, on the computer system 16; monitoring Internet browsing habits of the computer system 16 and reporting the information back to a computer system 54 of a person or another parasite entity; using resources of the computer system 16 free-of-charge for processing applications such as distributed-computing applications; recording keystrokes such as passwords made using the computer system 16 and reporting the keystrokes back to the computer system 54 of the parasite entity; accessing personal files on the computer system 16 to copy and deliver to the computer system 54 of the parasite entity; and needlessly degrading the overall performance of the computer system 16.

The parasite software 52 causes a change from the normal IP usage of the first customer computer system 16. This change is detected as being abnormal by the abnormal IP usage detector 46. The computer system 14 sends an alert message to the first customer computer system 16 to indicate a potential presence of parasite software on the first customer computer system 16. Optionally, a type of parasite software is identified based on the change in IP usage. The type may be identified by a specific name given to the parasite software, or by the unauthorized task(s) being performed by the parasite software. In this case, the alert message may further identify the type of the parasite software. The alert message may further include one or more suggestions on how to mitigate the parasite software (e.g. how to quarantine and/or remove the parasite software).

No such alert message is sent to the second customer computer system 18 at this time because its IP usage pattern has not abnormally changed from its baseline model 38.

As indicated by block 74, the method optionally comprises directing the customer, whose computer potentially has parasite software, to a third-party computer system 60 to mitigate the parasite software. The third-party computer system 60 may provide anti-parasite software 62 that can be downloaded by the customer. The customer may have to pay for the anti-parasite software 62. Continuing with the above example, the first customer can be directed to the third-party computer system 60. From a Web site provided by the third-party computer system 60, the first customer can download the anti-parasite software 62 to the computer system 16. The anti-parasite software 62 can be installed to the computer system 16 to mitigate (e.g. quarantine and/or remove) the parasite software 52.

As an alternative to block 74, the method may comprise the computer system 14 causing the parasite software 52 to be mitigated (e.g. quarantined and/or removed) from the computer system 16, as indicated by block 70. In this case, the computer system 14 may automatically forward anti-parasite software to the computer system 16 to mitigate the parasite software 52.

As indicated by block 72, the method may comprise the ISP sending the customer a billing statement 64 that indicates that the parasite software has been mitigated. The billing statement 64 is generated by a bill generator 66, which may be either co-located with or remotely located from the computer system 14. The billing statement 64 may be in either a hard copy form such as a paper bill sent in the mail, or a soft copy form such as an electronic billing statement viewable using the customer's computer system. The billing statement 64 may include a charge for mitigating the parasite software. Alternatively, the parasite software is mitigated without additional charge by the ISP based on a particular plan to which the customer has subscribed. The billing statement 64 may further indicate one or more other parasite software from the customer's computer system that the ISP has caused to be mitigated over a billing period.

Optionally, if the monitored IP usage pattern for a computer system was not considered to be abnormal in block 44, then the baseline model for the computer system can be modified based on the monitored IP usage pattern. This allows the baseline models in the database 34 to be updated on an ongoing basis.

ISPs can use embodiments of the present invention to provide tiered services to their subscribers. For example, a DSL service provider can provide two-tiered DSL which includes a basic DSL service and an advanced DSL service. The basic DSL service may provide parasite software warnings in which the provider notifies affected subscribers of the existence of parasite software and/or directs users to a third-party Web site such as symantec.com which provides a cure. The service provider can share revenue with the third-party enterprise for sales generated based on the directed users. The advanced DSL service may provide parasite software protection for a monthly fee. The service provider acts on behalf of the subscribers of the advanced DSL service to quarantine and/or remove parasite software. The service provider summarizes a list of parasite software it has removed from a subscriber's computer in a monthly bill to the subscriber.

The herein-disclosed acts performed by each computer system may be directed by respective computer-readable program code stored by a respective computer-readable medium. The herein-described components of the computer system 14 may be embodied by one or more computer processors directed by computer-readable program code. The data in the database 34 is stored as computer-readable data on a computer-readable medium.

It will be apparent to those skilled in the art that the disclosed embodiments may be modified in numerous ways and may assume many embodiments other than the particular forms specifically set out and described herein. For example, the ISP may provide the Internet service to its customers using an alternative to DSL, such as a satellite Internet service, a terrestrial wireless Internet service, or a cable-modem-based Internet service.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The present disclosure contemplates a machine readable medium containing instructions, or that which receives and executes instructions associated with a propagated signal, so that a device connected to a network environment can send or receive voice, video or data to communicate over the network.

It will be understood that a device as specified by the present disclosure may also be directed to other electronic devices of similar functionality. For example, a device that provides voice, video or data communication may be implemented as a telephone, a cordless telephone, a mobile phone, a cellular phone, a Personal Digital Assistant (PDA) or other computer-based communication devices.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   monitoring an Internet Protocol (IP) usage pattern of a first computer system, said monitoring being performed by a second computer system remotely located from the first computer system, wherein the second computer system is associated with an Internet Service Provider (ISP) and the first computer system is associated with a customer of the ISP;
   determining a baseline model of IP usage for the first computer system;
   identifying first parasite software at the first computer system based on an abnormal change in the IP usage pattern associated with the first parasite software, wherein the abnormal change in the IP usage pattern is detected by comparing the IP usage pattern to the baseline model of IP usage for the first computer system;
   forwarding anti-parasite software to automatically mitigate the first parasite software from the ISP to the first computer system; and
   sending a billing statement from the ISP to the customer of the ISP, wherein the billing statement indicates that the first parasite software was automatically mitigated by the ISP.

2. The method of claim 1, wherein the IP usage pattern is a time-of-day usage pattern.

3. The method of claim 1, wherein the IP usage pattern is a data volume pattern.

4. The method of claim 1, wherein the IP usage pattern is an IP service pattern.

5. The method of claim 1, wherein the IP usage pattern is a pattern of which one or more transfer protocols are used by the first computer system.

6. The method of claim 1, wherein the first parasite software is automatically mitigated by at least one of quarantining the first software and removing the first parasite software.

7. A system comprising:
   a processor;
   an Internet Protocol (IP) usage monitor associated with an Internet Sevice Provider (ISP), the IP usage monitor executable by the processor to monitor an IP usage pattern of a remotely-located computer system associated with a customer of the ISP;
   a database that stores a baseline model of IP usage for the remotely-located computer system;
   an abnormal IP usage detector associated with the ISP, responsive to the IP usage monitor, the abnormal IP usage detector executable by the processor to identify parasite software at the remotely-located computer system based on an abnormal change in the IP usage pattern, wherein the abnormal IP usage detector detects the abnormal change in the IP usage pattern by comparing the IP usage pattern to the baseline model of IP usage for the remotely-located computer system;

a parasite software mitigator associated with the ISP, the parasite software mitigator executable by the processor to forward anti-parasite software from the ISP to the remotely-located computer system associated with the customer of the ISP to automatically mitigate the parasite software; and a bill generator associated with the ISP, the bill generator executable by the processor to send a billing statement from the ISP to the customer of the ISP, wherein the billing statement indicates that the parasite software was automatically mitigated by the ISP.

8. The system of claim 7, wherein the IP usage pattern is a time-of-day usage pattern.

9. The system of claim 7, wherein the IP usage pattern is a data volume pattern.

10. The system of claim 7, wherein the IP usage pattern is an IP service pattern.

11. The system of claim 7, wherein the IP usage pattern is a pattern of which one or more transfer protocols are used by the remotely-located computer system.

12. The system of claim 7, wherein the parasite software is automatically mitigated by at least one of quarantining the parasite software and removing the parasite software.

13. The method of claim 1, further comprising:
identifying second parasite software at the first computer system based on an abnormal change in the IP usage pattern associated with the second parasite software; and forwarding anti-parasite software to automatically mitigate the second parasite software from the ISP to the first computer system, wherein the billing statement further indicates that the second parasite software was automatically mitigated by the ISP.

14. The method of claim 13, wherein the billing statement includes a first charge associated with the ISP automatically mitigating the first parasite software and a second charge associated with the ISP automatically mitigating the second parasite software.

15. The method of claim 1, wherein the billing statement includes a charge associated with the ISP automatically mitigating the first parasite software.

16. The method of claim 1, wherein the second computer system is located at an ISP control center.

17. The method of claim 1, wherein the first computer system is communicatively coupled to the second computer system via a Digital Subscriber Line Access Multiplexer (DSLAM).

18. The method of claim 1, wherein the first parasite software includes one of spyware and adware.

19. The method of claim 1, wherein the baseline model of IP usage includes a customer-specific baseline model that is determined based on a pattern of IP usage associated with the first computer system.

20. The method of claim 1, wherein the baseline model of IP usage includes a general baseline model that is determined based on a general model of IP usage.

21. The method of claim 1, wherein the baseline model of usage for the first computer system indicates that only Hypertext Transfer Protocol (HTTP) sessions are initiated from the first computer system, and wherein the abnormal change in the IP usage pattern includes an initiation of a File Transfer Protocol (FTP) session from the first computer system.

22. The method of claim 5, wherein the one or more transfer protocols include one or more of Hypertext Transfer Protocol (HTTP), Simple Mail Transfer Protocol (SMTP), Peer-to-Peer Protocol (P2P), Voice over Internet Protocol (VoIP), and File Transfer Protocol (FTP).

* * * * *